March 25, 1941. K. BRATRING 2,236,306
PRODUCTION OF HOLLOW ARTICLES
Filed Oct. 14, 1938
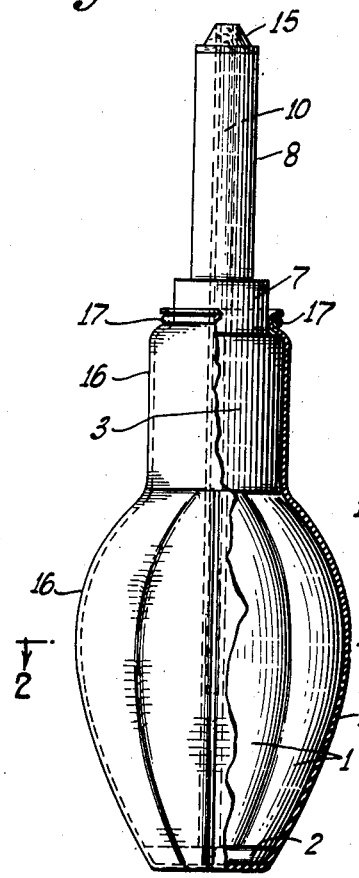
Fig.1.
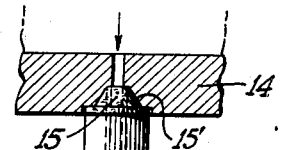
Fig.4.
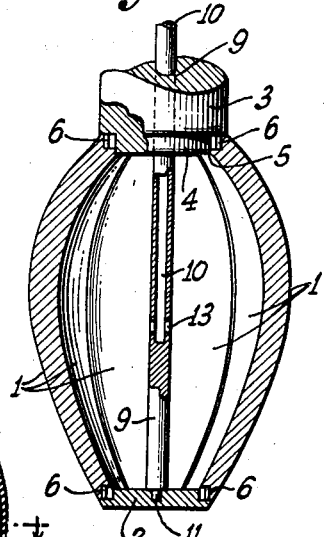
Fig.3.
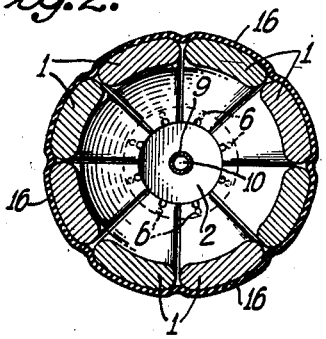
Fig.2.
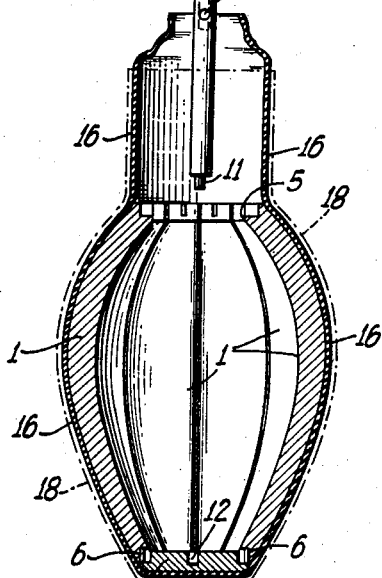
INVENTOR
Kurt Bratring Patented Mar. 25, 1941

2,236,306

UNITED STATES PATENT OFFICE 2,236,306

PRODUCTION OF HOLLOW ARTICLES

Kurt Bratring, Berlin, Germany, assignor to Neocell Products Corporation, a corporation of Delaware Application October 14, 1938, Serial No. 234,914
In Germany February 12, 1935

4 Claims. (Cl. 18—41)

This invention relates to the production of hollow articles by immersion of a mold in a bath of a film-forming substance, and has for its object the provision of a novel mold and method of employing the same which are peculiarly suitable for the production of hollow articles of intricate shapes and of the highest quality.

In the production of hollow articles by immersion processes, articles of bottle form, that is articles having reduced neck portions, present a serious special problem in connection with the removal of the mold from the finished article.

The mold of my invention permits of the easy manufacture of articles having substantial neck reductions and of various intricate forms, and yet when the article is completed all parts of the mold may be readily removed therefrom without the necessity of unduly handling the article and without any danger of damaging it.

My invention may be more fully understood from the accompanying description of the drawing, wherein:

Fig. 1 shows a mold according to my invention ready for immersion;

Fig. 2 shows the mold of Fig. 1 in cross section perpendicular to the axis, on the line II—II;

Fig. 3 shows the body of the mold of Fig. 1 in part cross section parallel to the axis; and Fig. 4 shows the same mold after completion of the immersion process and after partial disassembly of the mold, preparatory to removing the finished article.

Referring now to the figures, Fig. 1 shows a mold according to my invention adapted to the formation of a pear-shaped bottle having fluted sides. The core of the mold is built up of separate preformed rib core sections 1, a base 2, and a head 3. As shown in Fig. 3, the head 3 is a cylinder having a short lower cylindrical extension 4 of reduced diameter, thus providing a shoulder 5 which fits snugly on the upper ends of the ribs, while at the same time the inner faces of the upper ends of the ribs fit snugly around the cylindrical extension 4. This construction holds the ribs 1 firmly in position though they be not in actual contact with one another.

The shoulder 5 is provided with pins 6 which fit into slots cut into the upper surfaces of the ribs and serve to hold the core together.

The head 3 has a shoulder 7 at the top for a purpose later to be described and an upper extension 8 which serves as a handle for grasping and manipulating the mold, and also as a support for a central tube to be described.

The lower ends of the ribs fit against the base 2, and are likewise retained in position by pins 6 provided on the base and fitting in slots cut into the lower ends of the ribs.

The head is provided with a central channel 9 through which a tube 10, terminating in a pin 11, extends to the base of the core where it fits into a central hole 12 and serves to center the head and hold it firmly in position during the immersion operation.

The axial hole through the tube 10 reaches from the upper end to some point short of the lower end where a diametral hole 13 pierces the tube and connects with the axial hole. The tube is preferably provided at its upper end with some suitable pneumatic joint to a mold frame 14. This joint may consist of a conical piece of rubber 15 fixed to the tube 10 and fitting into a corresponding recess 15' in the mold frame 14.

As shown in Fig. 2, each of the ribs is slightly separated from the adjacent ribs. This is in order that the ribs 1 may bear firmly against the head 3 and the base 2, not being held away therefrom by mutual contact between themselves. Furthermore, adjacent sides of the ribs 1 are cut away in such fashion that when, after the removal of the head 3 they come into mutual contact, they shall not behave too much like the stones of an arch and hold together so tightly as to cause difficulty in removing them from the finished article. Again referring to Fig. 2, each rib 1 may be so shaped that when the ribs are placed together the outside cross section of the core as a whole will be closely that required of the finished article.

After the core has been built up by fitting the ribs 1, the base 2 and the head 3 together, and inserting the pin 11 at the foot of the tube 10 into the hole 12 in the base 2, an elastic jacket 16, preferably one whose unstretched diameter is at least as small as the diameter of the head 3, is drawn over the core and tightly drawn upwards toward the head extension 8 and made fast above the shoulder 7 as shown in Fig. 1 by a rubber band 17 or the like. If desired, the rubber band 17 may, of course, be integral with the jacket 16 itself.

I have found that a jacket of this character and form which is preferably made of thin, highly elastic material such as rubber, and may properly be termed a bladder, when placed on the core under longitudinal tension as above described, fits snugly against all parts of the surface of the core, including particularly the shoulder 7 and the flutings formed by the spaces between the ribs 1 as long as the latter are not exceptionally sharp or deep. The tension which exists in the rubber due to its being of smaller diameter than the head 3 is responsible for the snug fit at the shoulder 7, and the longitudinal tension applied by stretching it upward over the core is responsible for its fitting snugly into the flutings. If in addition the shoulder 7 is not particularly pronounced, longitudinal tension may alone be sufficient, since when stretched axially, such a jacket tends naturally to contract in diameter.

Having assembled my mold as above described, I may next dip it into a solution of the desired film-forming substance, withdraw it bearing an adherent film, dry the film, and repeat as often as necessary to secure the desired thickness of the article. Each drying operation is preferably commenced in a cool atmosphere in order to eliminate the possibility of bubbles in the finished article, in accordance with the invention described and claimed in my application Serial No. 218,327, filed July 9, 1938, which invention is not herein claimed, but is claimed in said pending application.

When, however, it is desired that the finished article should have a very smooth and lustrous surface, I dip the complete mold before it is used to produce the formed articles, in a solution of gelatine, glycerine and sugar, for example, 100 grams of gelatine, 100 grams of saccharose and 20 grams of glycerine in 800 cubic centimeters of water, and thoroughly dry the resulting coating in accordance with the invention of my prior patent application Serial No. 140,768 filed May 4, 1937, which invention is not herein claimed, but is claimed in said pending application. The coating as formed is highly lustrous and polished, and communicates its properties of smoothness and lustre to the finished article. After the article is dipped in the article-forming solution, and thoroughly dried, the mold carrying the article is treated with warm water, as described in said application, whereupon the coating turns into a soft, liquid or semi-liquid lubricant, which facilitates the later removal of the jacket from the formed article.

During these immersion and drying operations the mold of my invention may be handled singly, in which case it may conveniently be grasped and manipulated by the head extension 8. On the other hand it may be grouped with a number of similar molds on a mold frame 14 for multiple production, in which case it is preferably provided at the upper end of the head extension 8 with a rubber cork 15, forming a pneumatic connection with the mold frame 14. It will be understood that if desired, modifications in the extension and in the pneumatic connection at the upper end of the tube 10 may be made to adapt the mold to a machine for multiple production.

At the conclusion of the immersion operation, the mold is covered with a lustrous film 18 of the desired thickness which, when completely dry, will constitute the finished article, but which particularly if it has been subjected to warmth and moisture to soften the intermediate skin, may still be in somewhat tacky condition and must therefore not be touched. In accordance with my invention I now remove the binding of the rubber jacket 16 to the shoulder 7 of the head 3, either by cutting the rubber band 17 or by cutting the jacket 16 itself at the shoulder 7, and blow air under pressure into the upper end of the tube 10. The air enters the chamber formed by the core sections through the diametral hole 13 and expands the body of the mold, the jacket 16, and the article 18 by a minute amount, just sufficient to free the head 3 from the grasp of the upper ends of the ribs 1, whereupon the head 3 itself, being now held only by the slight tension of the jacket 16, rises with respect to the ribs 1 and the jacket 16 and becomes entirely free therefrom. In practice, the actual motion is more usually the reverse, the head being fixed and the air pressure driving the mold with the jacket and the finished article downward and out of engagement with the head. The finished article containing the jacket, the ribs and the base may be dropped into a bath of cold water to initiate the washing of the article.

To remove the ribs 1 and base 2 from the finished article 18 it may be necessary to shake the article slightly, whereupon the ribs 1, no longer supported and held apart at their upper ends by the head 3, but on the contrary being forced together by the tension of the jacket 16, fall together at the neck of the finished article 18 and may be withdrawn or shaken out one by one. After the base has likewise been removed, the rubber jacket, due to its initial tension and preferably assisted by the lubricating action of the intermediate skin, automatically frees itself from the inner surface of the finished article 18 and may be washed out or otherwise readily withdrawn.

If it be found that the restraint of the neck portion of the rubber jacket 16 offers a severe impediment to the removal of the head 3 as above described, this may easily be prevented by applying any suitable lubricant to the mold before the jacket 16 is drawn over it.

The pear-shaped fluted mold of the drawing is, of course, merely exemplary, and it is to be understood that the principles of my invention are equally well adapted to the production of hollow articles of the most various forms, for example, dumb-bell shaped articles.

I have found that the mold of this invention is well suited to the production of articles of the highest quality and elegance; for example, perfume or cosmetics jars.

What I claim and desire to secure by Letters Patent is:

1. A collapsible mold comprising a base element, a plurality of convex rib-like elements engaging said base element and positioned adjacent one another, a head element positioned to engage the opposite ends of said rib elements, a thin elastic element positioned to cover the outer faces of said base, said ribs and said head element and stretched to hold said rib elements under compression, means to hold the elastic element in the position described, the over-all maximum diameter of the rib elements when assembled being considerably in excess of the over-all maximum diameter of the head element and the maximum over-all dimension of each rib element circumferentially of the mold being less than the internal diameter of an article molded about said head element.

2. A collapsible mold comprising a base element, a plurality of convex rib-like elements engaging said base element and positioned adjacent one another, a head element positioned to engage the opposite ends of said rib elements, both said base and said head element being provided with means to cooperate with means on said rib elements and for holding said rib elements in fixed position with respect to said base and head elements, a thin elastic element positioned to cover the outer faces of said base, said ribs and said head element and stretched to hold said rib elements under compression, means to hold the elastic element in the position described, the over-all maximum diameter of the rib elements when assembled being considerably in excess of the over-all maximum diameter of the head element, and the maximum over-all dimension of each rib element circumferentially of the mold being less than the internal diameter of an article molded about said head element.

3. A collapsible mold comprising a base element, a plurality of convex rib-like elements engaging said base element and positioned adjacent one another, a head element positioned to engage the opposite ends of said rib elements, a thin elastic element positioned to cover the outer faces of said base, said ribs and said head element and stretched to hold said rib elements under compression, means to hold the elastic element in the position described, the over-all maximum diameter of the rib elements when assembled being considerably in excess of the over-all maximum diameter of the head element and the maximum over-all dimension of each rib element circumferentially of the mold being less than the internal diameter of an article molded about said head element, and means for supplying air under pressure to the chamber formed by the rib elements.

4. A collapsible mold comprising a base element, a plurality of convex rib-like elements engaging said base element and positioned adjacent one another, a head element positioned to engage the opposite ends of said rib elements, a thin elastic element positioned to cover the outer faces of said base, said ribs and said head element and stretched to hold said rib elements under compression, means to hold the elastic element in the position described, the over-all maximum diameter of the rib elements when assembled being considerably in excess of the over-all maximum diameter of the head element and the maximum over-all dimension of each rib element circumferentially of the mold being less than the internal diameter of an article molded about said head element, and pneumatic means for displacing the head element from the rib elements whereby the rib elements may be singly removed through the restricted neck of the article molded upon said mold.

KURT BRATRING.